United States Patent [19]
Fujii

[11] Patent Number: 5,337,204
[45] Date of Patent: Aug. 9, 1994

[54] TAPE CASSETTE HAVING RECESSES FOR CASSETTE LOADING

[75] Inventor: Hiroshi Fujii, Tokyo, Japan

[73] Assignee: Sony Corporation, Tokyo, Japan

[21] Appl. No.: 101,672

[22] Filed: Aug. 4, 1993

Related U.S. Application Data

[63] Continuation of Ser. No. 780,336, Oct. 22, 1991, abandoned.

[30] Foreign Application Priority Data

Nov. 8, 1990 [JP] Japan ............... 2-117299[U]

[51] Int. Cl.⁵ .............................. G11B 23/02
[52] U.S. Cl. .................... 360/132; 360/85; 360/96.5
[58] Field of Search ............. 360/132, 96.5, 96.6, 360/85, 95.5

[56] References Cited

U.S. PATENT DOCUMENTS

| | | | |
|---|---|---|---|
| 3,900,170 | 8/1975 | Serizawa | 360/132 |
| 3,918,087 | 11/1975 | Korn | 360/94 |
| 3,950,785 | 4/1976 | Findley | 360/132 |
| 3,971,071 | 7/1976 | Urayama | 360/132 |
| 4,556,153 | 12/1985 | Takagi et al. | 360/132 |
| 4,694,360 | 9/1987 | Ohyama et al. | 360/96.5 |
| 4,881,137 | 11/1989 | Meguro et al. | 360/96.5 |
| 4,962,898 | 10/1990 | Lee | 360/132 |

FOREIGN PATENT DOCUMENTS

| | | |
|---|---|---|
| 0159591 | 10/1985 | European Pat. Off. |
| 0434143A2 | 6/1991 | European Pat. Off. |

OTHER PUBLICATIONS

Patent Abstracts of Japan, vol. 11, No. 156 (P-578) 21 May 1987 & JP-A-61 292 259 (Matsushita) 23 Dec. 1986.
Patent Abstracts of Japan, vol. 13, No. 102 (P-841) 10 Mar. 1989 & JP-A-63 281 269 (Matsushita) 17 Nov. 1988.
Patent Abstracts of Japan, vol. 12, No. 71 (P-673) 5 Mar. 1988 & JP-A-62 209 762 (Mitsubishi) 14 Sep. 1987.
Patent Abstracts of Japan, vol. 11, No. 248 (P-604) 13 Aug. 1987 & JP-A-62 054 882 (Sony) 10 Mar. 1987.
Patent Abstracts of Japan vol. 10, No. 154 (P-463) 4 Jun. 1986 & JP-A-61 008 766 (Matsushita) 16 Jan. 1986.

Primary Examiner—Edward P. Westin
Assistant Examiner—Jon Santamauro
Attorney, Agent, or Firm—William S. Frommer; Alvin Sinderbrand

[57] ABSTRACT

In a tape cassette for use in a recording and reproducing apparatus such as a video tape recorder, and which includes a casing having a tape withdrawal opening, a pair of reels rotatably mounted in the casing with a tape wound around the reels and extending between the reels across the opening for withdrawal from the casing through such opening and a lid pivotally mounted on the casing for covering the tape withdrawal opening; the casing has at least one recess near the lid for secure engagement by a holding member on a cassette holder of the recording and reproducing apparatus so long as the cassette holder is displaced from a cassette ejecting and receiving position.

8 Claims, 8 Drawing Sheets

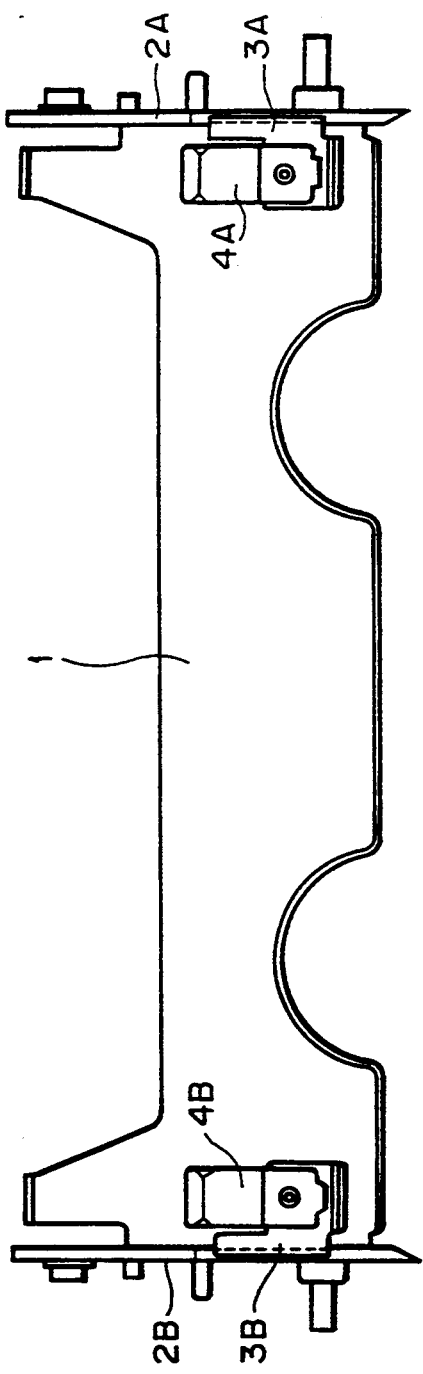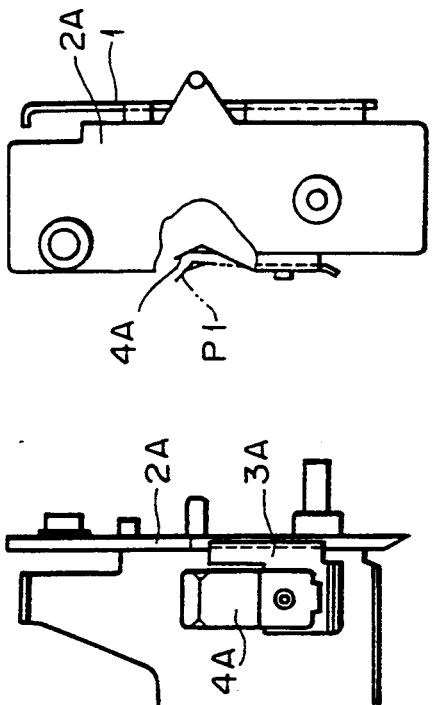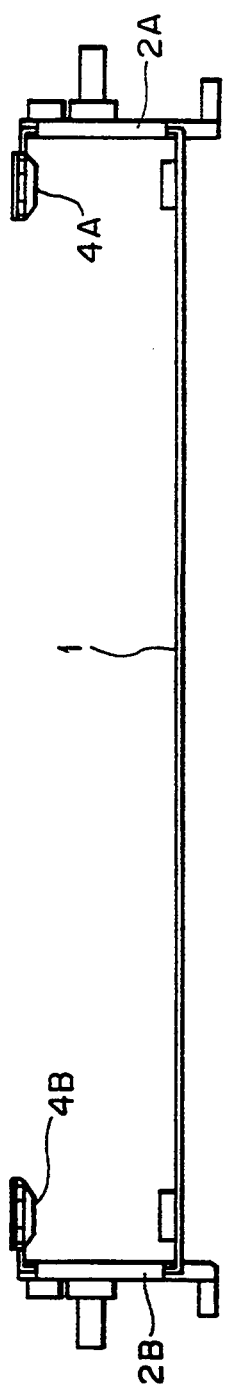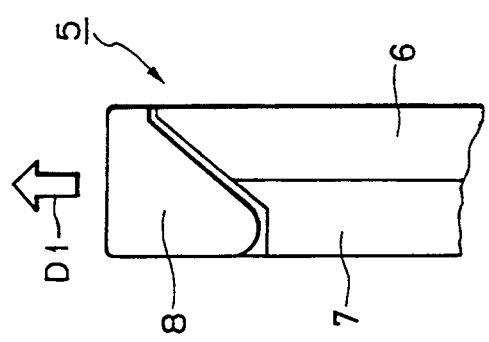

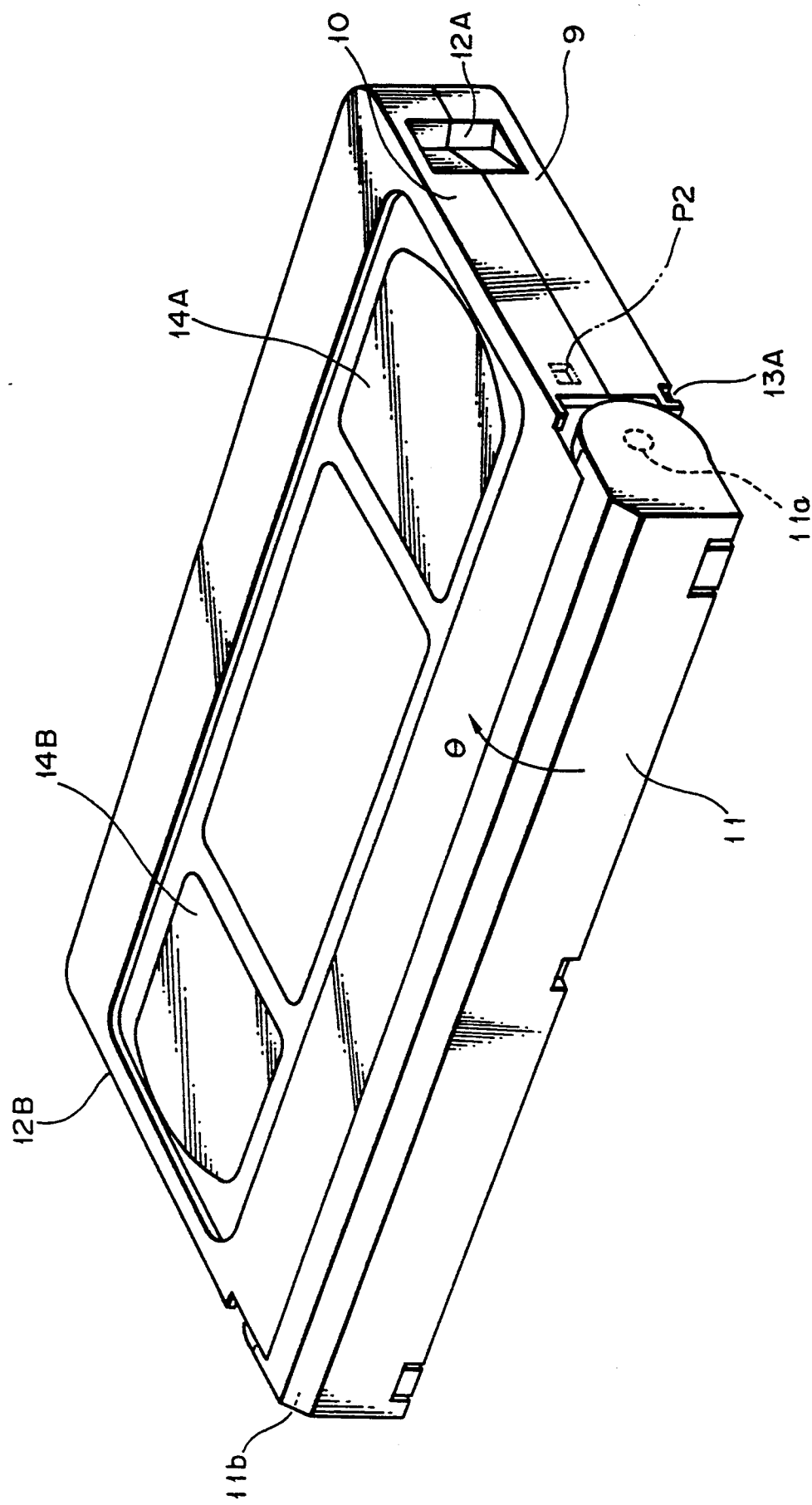

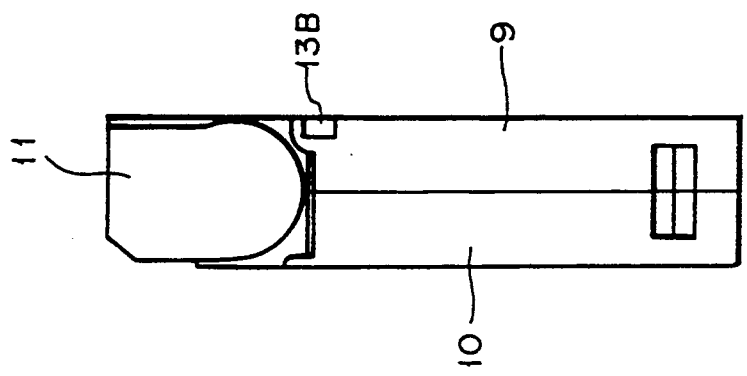
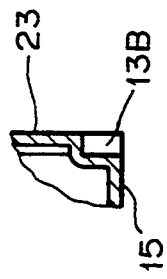
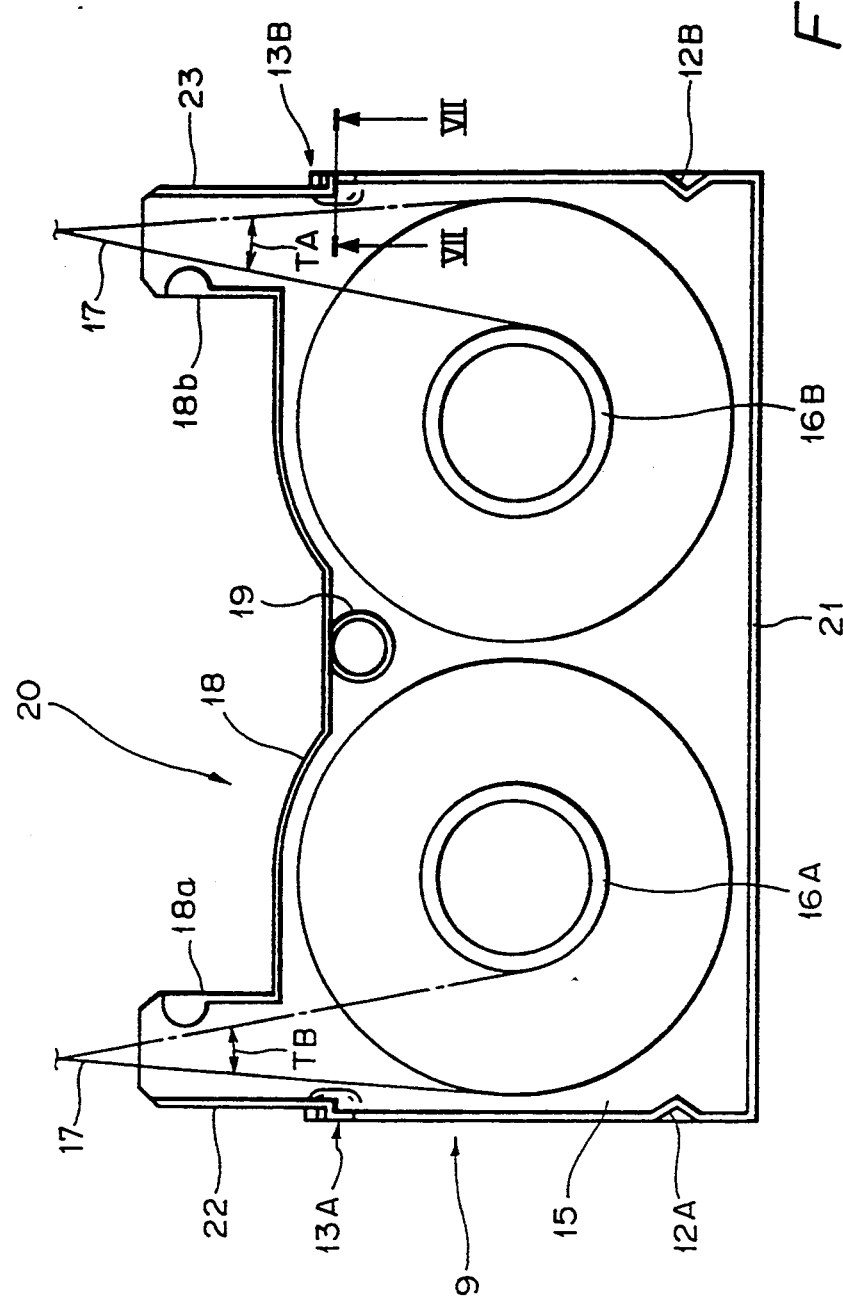

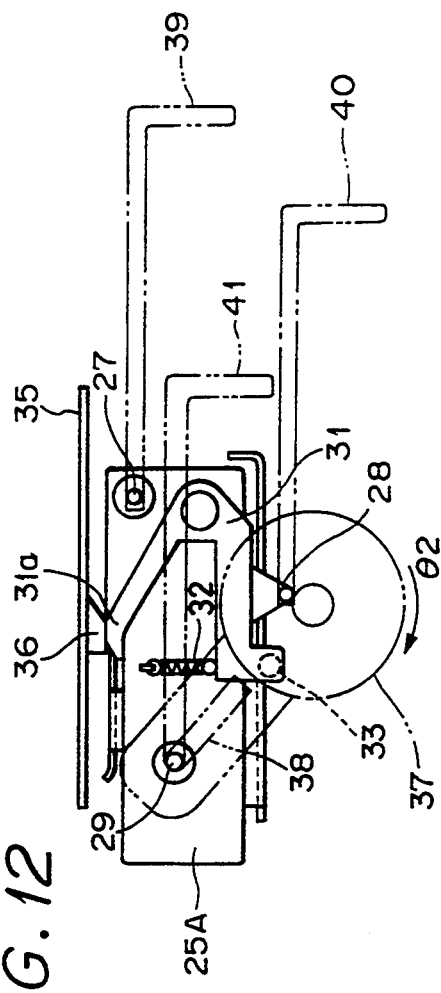
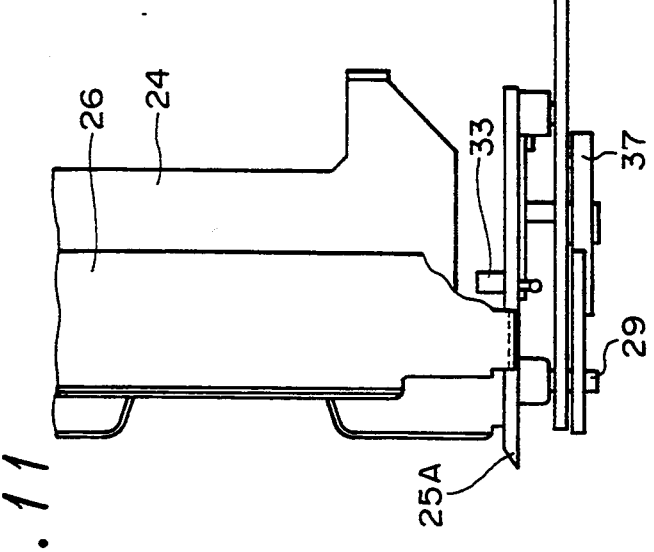
FIG. 11
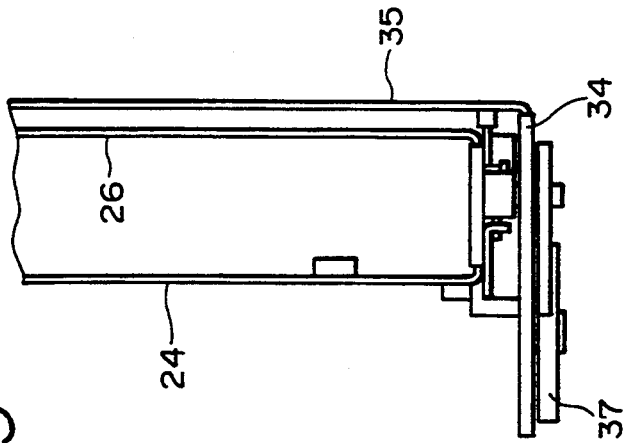
FIG. 13
FIG. 12

TAPE CASSETTE HAVING RECESSES FOR CASSETTE LOADING

This application is a continuation of application Ser. No. 07/780,336, filed Oct. 22, 1991, now abandoned.

BACKGROUND OF THE INVENTION

1. Field of the Invention

The present invention relates to a tape cassette for use in a video tape recorder (VTR).

2. Description of the Prior Art

Front-loading video tape recorders have a cassette insertion slot defined in the front panel thereof for loading and unloading a tape cassette therethrough. The loaded tape cassette is retained by a cassette holder that is positioned within the video tape recorder housing adjacent to the cassette insertion slot. Thereafter, the cassette holder is moved along a predetermined path to bring the tape cassette to a position near recording and reproducing heads. It is therefore desired that the cassette holder be of a structure capable of reliably retaining the tape cassette and the tape cassette be of a structure that can easily be held by the cassette holder.

FIGS. 1 through 3 of the accompanying drawings show a conventional cassette holder. In FIGS. 1 through 3, the cassette holder has a bottom plate 1, a pair of side plates 2A, 2B extending upwardly from opposite side edges of the bottom plate 1, and a pair of top plates 3A, 3B extending from upper edges of the side plates 2A, 2B toward each other parallel to the bottom plate 1. Presser springs 4A, 4B are mounted respectively on the top plates 3A, 3B. As shown in FIG. 3, a conventional tape cassette 5 comprises a lower casing half 6, an upper casing half 7, and a front lid 8. When the tape cassette 5 is inserted into the cassette holder in the direction indicated by the arrow D1, the presser springs 4A, 4B are elastically displaced to a position P1, and the tape cassette 5 is retained in position between the presser springs 4A, 4B and the bottom plate 1 under biasing forces from the presser springs 4A, 4B.

If the biasing forces of the presser springs 4A, 4B are too strong, they tend to damage the tape cassette or prevent the tape cassette from being loaded smoothly into the cassette holder. If the biasing forces of the presser springs 4A, 4B are too weak, the tape cassette would possibly be left behind the cassette holder when the cassette holder is moved toward the recording and reproducing heads.

To avoid the above shortcomings, it has been customary to lower the speed at which the cassette holder moves and also to keep the biasing forces of the presser springs 4A, 4B within a small allowable range. However, such a conventional practice is disadvantageous in that the speed at which the tape cassette is loaded is low and the cost of manufacturing the loading mechanism is high.

Another problem is that the biasing forces of the presser springs 4A, 4B decrease overtime due to aging, resulting in progressively smaller retentive forces with which the tape cassette is retained in the cassette holder.

Various efforts have been made to lock tape cassettes securely in cassette holders. However, all of the prior attempts have failed to solve the above problems because they rely on frictional forces against a flat surface of the tape cassettes to retain them in place in the tape holders.

OBJECTS AND SUMMARY OF THE INVENTION

In view of the aforesaid drawbacks of the conventional tape cassettes, it is an object of the present invention to provide a tape cassette which can reliably and quickly be loaded into a recording and reproducing apparatus.

According to an aspect of the present invention, there is provided a tape cassette for use in a recording and reproducing apparatus, comprising a casing having an opening, a pair of reels rotatably mounted in the casing with a tape wound around the reels and being withdrawable from the casing through the opening, a lid pivotally mounted on the casing for covering the opening when the cassette is not in use, the casing having at least one recess near the lid for secure engagement by a holding member of the recording and reproducing apparatus. With the tape cassette securely retained in the cassette holder, the tape cassette can be loaded reliably and quickly into the video tape recorder.

The above and other objects, features, and advantages of the present invention will become apparent from the following description of an illustrative embodiment thereof to be read in conjunction with the accompanying drawings, in which like reference numerals represent the same or similar objects.

BRIEF DESCRIPTION OF THE DRAWINGS

FIG. 1 is a plan view of a conventional cassette holder;

FIG. 2 is a front elevational view of the conventional cassette holder shown in FIG. 1;

FIG. 3 is a side elevational view, partly broken away, of the conventional cassette holder shown in FIG. 1 and a conventional tape cassette to be loaded into the cassette holder;

FIG. 4 is a perspective view of a tape cassette according to the present invention;

FIG. 5 is a plan view of a lower casing half of the tape cassette shown in FIG. 4;

FIG. 6 is a side elevational view of the tape cassette shown in FIG. 4;

FIG. 7 is a cross-sectional view taken along line VII—VII of FIG. 5;

FIG. 11 is a fragmentary plan view of a loading mechanism for loading the tape cassette shown in FIG. 8;

FIG. 12 is a side elevational view of the loading mechanism;

FIG. 13 is a front elevational view of the loading mechanism;

DETAILED DESCRIPTION OF THE PREFERRED EMBODIMENT

Figure 10:
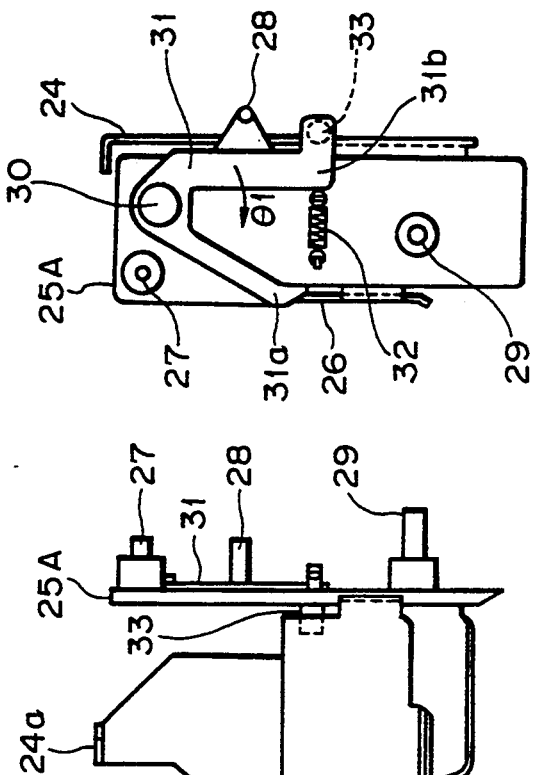
FIG. 10 is a side elevational view of the cassette holder shown in FIG. 8.

FIGS. 4 through 7 show a tape cassette according to the present invention, for use in a video tape recorder.

As shown in FIG. 4, the tape cassette includes a casing comprising a lower casing half 9 and an upper casing half 10 each molded of synthetic resin. A pair of reels 16A, 16B (FIG. 5) with a magnetic tape 17 wound therearound is rotatably disposed in the lower casing half 9. The magnetic tape 17 can be drawn out of the casing through an opening defined in the casing.

The tape cassette also has a front lid 11 pivotally mounted on the casing by a pair of pivots 11a, 11b disposed on opposite sides of the casing near the opening. The opposite sides of the casing have respective finger recesses 12A, 12B of triangular cross section which are defined therein remotely from the front lid 11.

When the tape cassette is loaded into a video tape recorder, the front lid 11 is angularly moved approximately 90° about the pivot pins 11a, 11b in the upward direction indicated by the arrow θ. Then, the magnetic tape 17 is drawn from the opening of the casing. When the tape cassette is unloaded from the video tape recorder, the front lid 11 is angularly moved downwardly for again covering the opening of the casing. The tape cassette also has an inner lid (not shown) disposed inwardly of the front lid 11 and angularly movable with the front lid 11. With the tape cassette removed from the video tape recorder, the length of the magnetic tape 11 that is positioned in the opening is sandwiched between the inner lid and the front lid 11.

According to the present invention, a recess 13A is defined in the bottom wall and one of the side walls of the lower casing half 9 near the front lid 11, and a symmetrically located recess 13B is also defined in the bottom wall and the other side wall of the lower casing half 9 near the front lid 11. The upper casing half 10 has windows 14A, 14B defined in its upper wall.

The recesses 13A, 13B will be described in detail below with reference to FIGS. 5 through 7. As shown in FIG. 5, the reels 16A, 16B are rotatably mounted on a bottom wall 15 of the lower casing half 9, with the magnetic tape 17 wound around the reels 16A, 16B. The lower casing half 9 has a front wall 18, a hollow cylindrical wall 19 held against the front wall 18, a rear wall 21 spaced from the front wall 18, a pair of spaced side walls 22, 23 extending from the rear wall 21 toward opposite sides of the front wall 18. The opening of the casing provides a mouth 20 positioned in front of the front wall 18. The cylindrical wall 19 receives therein light-emitting elements of start-of-tape and end-of-tape sensors that are disposed in the video tape recorder.

The side walls 22, 23 have outer recessed surfaces located laterally of the mouth 20, and the front lid 11 is pivotally attached to the outer recessed surfaces of the side walls 22, 23. As shown in FIGS. 5, 6 and 7, the recess 13A is defined in a boundary region between the bottom wall 15 and the side wall 22 near the recessed surface thereof, and the recess 13B is defined in a boundary region between the bottom wall 15 and the side wall 23 near the recessed surface thereof.

As shown in FIG. 5, the magnetic tape 17 passes through a withdrawal region having an angular extent TB between one tip end 18a of the front wall 18 and the front end of the side wall 22, and a withdrawal region having an angular extent TA between the other tip end 18b of the front wall 18 and the front end of the side wall 23. The recesses 13A, 13B are positioned in front of a straight line passing through the centers of the reels 16A, 16b, and are clear of the withdrawal regions of angular extents TA, TB, thus avoiding any adverse affects on, or physical interference with the reel flanges of the reels 16A, 16B and the magnetic tape 17 as it is withdrawn out of the casing.

Generally, a lock mechanism is required to lock the front lid 11 against movement after the tape cassette has been removed from the video tape recorder. Heretofore, the lock mechanism was associated with the side wall 22 or 23 of the lower casing half 9. According to the present invention, however, the lock mechanism is associated with the tip end 18a or 18b of the front wall 18 of the lower casing half 9, i.e., around the mouth 20. Since the lock mechanism is located around the mouth 20, the side walls 22, 23 of the lower casing half 9 are structurally simple, making it easy to define the recesses 13A, 13B therein.

A loading mechanism for loading a tape cassette reliably and quickly into a front-loading video tape recorder, through the use of the recesses 13A, 13B of the tape cassette, will be described below with reference to FIGS. 8 through 16A, 16B.

Figure 8:
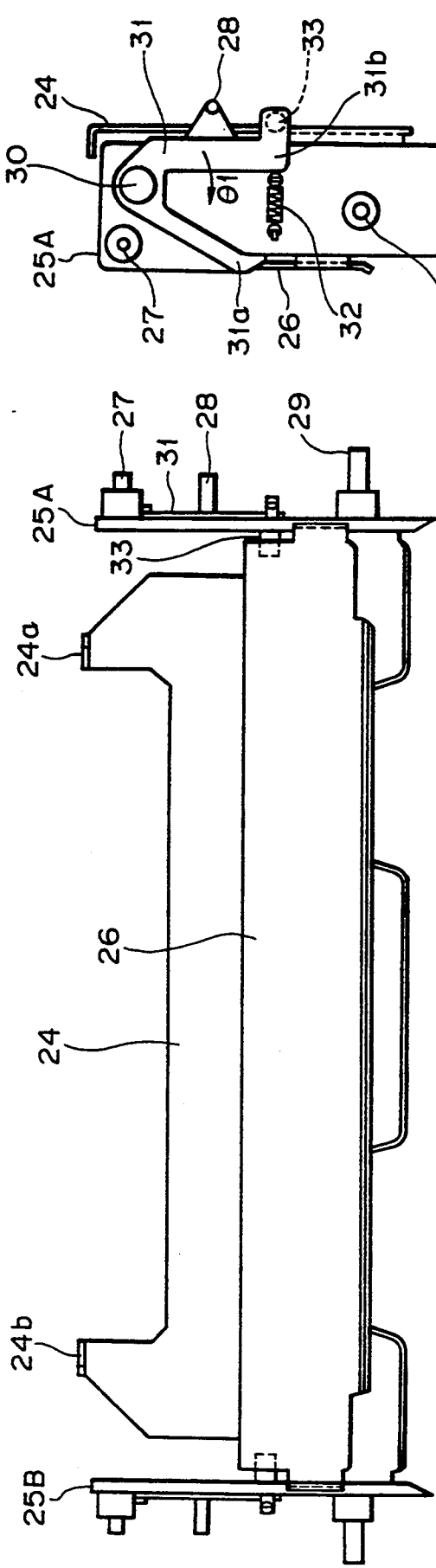
FIG. 8 is a plan view of a cassette holder in a video tape recorder into which the tape cassette according to the present invention is to be loaded.
Figure 9:
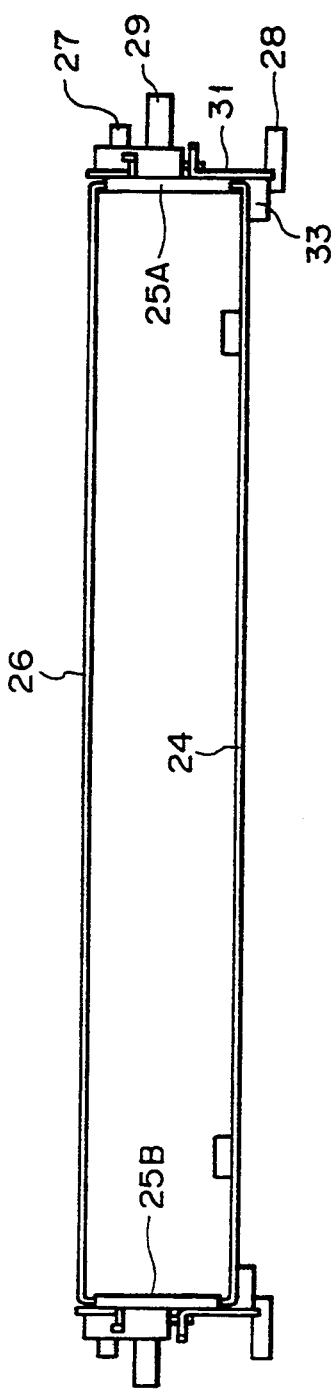
FIG. 9 is a front elevational view of the cassette holder shown in FIG. 8.

FIGS. 8, 9, and 10 show a cassette holder in a cassette insertion region of the loading mechanism. The cassette holder comprises a bottom plate 24, a pair of side plates 25A, 25B extending upwardly from opposite side edges of the bottom plate 24, and a top plate 26 extending between upper edges of the side plates 25A, 25B above and parallel to the bottom plate 24. The bottom plate 24 has a pair of cassette stoppers 24a, 24b in the form of bent ends thereof. The tape cassette is inserted between the bottom plate 24 and the top plate 26.

The side plate 25A supports three pins 27, 28, 29 extending outwardly from its outer side. A V-shaped lever 31 is rotatably mounted on the outer surface of the side plate 25A by a pivot pin 30. The lever 31 has a substantially triangular end 31a. The lever 31 is biased toward the top plate 26, that is, in the direction indicated by the arrow θ1 by a spring 32 connected between an upper portion of the side plate 25A and an opposite end 31B of the lever 31. A locking pin 33 for engagement in the recess 13b of the tape cassette is mounted on the opposite end 31b of the lever 31. Similarly, the side plate 25B supports three pins extending outwardly from its outer side, and a spring-biased V-shaped lever is rotatably mounted on the outer surface of the side plate 25B by a pivot pin. A locking pin for engagement in the recess 13A of the tape cassette is mounted on the lever on the side plate 25B.

FIGS. 11 through 13 illustrate the relationship between the cassette holder and the loading mechanism. In FIGS. 11 through 13, the loading mechanism is shown to include a fixed side plate 34 and a fixed top plate 35 which are fixed to a video tape recorder housing. The side plate 25A and the top plate 26 of the cassette holder are disposed parallel to the fixed side plate 34 and the fixed top plate 35, respectively. The fixed top plate 35 has a projection 36 on a lower surface thereof. When the cassette holder is disposed near a cassette insertion slot of the video tape recorder, the end 31a of the lever 31 is contacted by the projection 36 as shown in FIG. 12. At this time, since the locking pin 33 on the opposite end 31b of the lever 31 is positioned below the bottom plate 24 of the cassette holder, the tape cassette can be inserted into smoothly the cassette holder.

As shown in FIG. 12, the fixed side plate 34 has three L-shaped grooves 39, 40, 41 defined therein. The pins 27, 28, 29 on the side plate 25A of the cassette holder are inserted respectively in the L-shaped grooves 39, 40, 41. An actuator arm 37 is rotatably mounted on the outer surface of the fixed side plate 34 by a rotatable shaft. The actuator arm 37 has a groove 38 defined in a radially extending arm portion thereof, and in which the pin 29 of the cassette holder is received.

When the actuator arm 37 is rotated in the direction indicated by the arrow θ2 by an actuator mechanism (not shown), the cassette holder is moved along the grooves 39, 40, 41 to a position near recording and reproducing heads of the video tape recorder. The loading mechanism also has another fixed side plate (not shown) symmetrical to the fixed side plate 34. The other fixed side plate has grooves that receive the pins on the side plate 25B of the cassette holder, and is also associated with an actuator arm identical to the actuator arm 37.

Figure 14A:
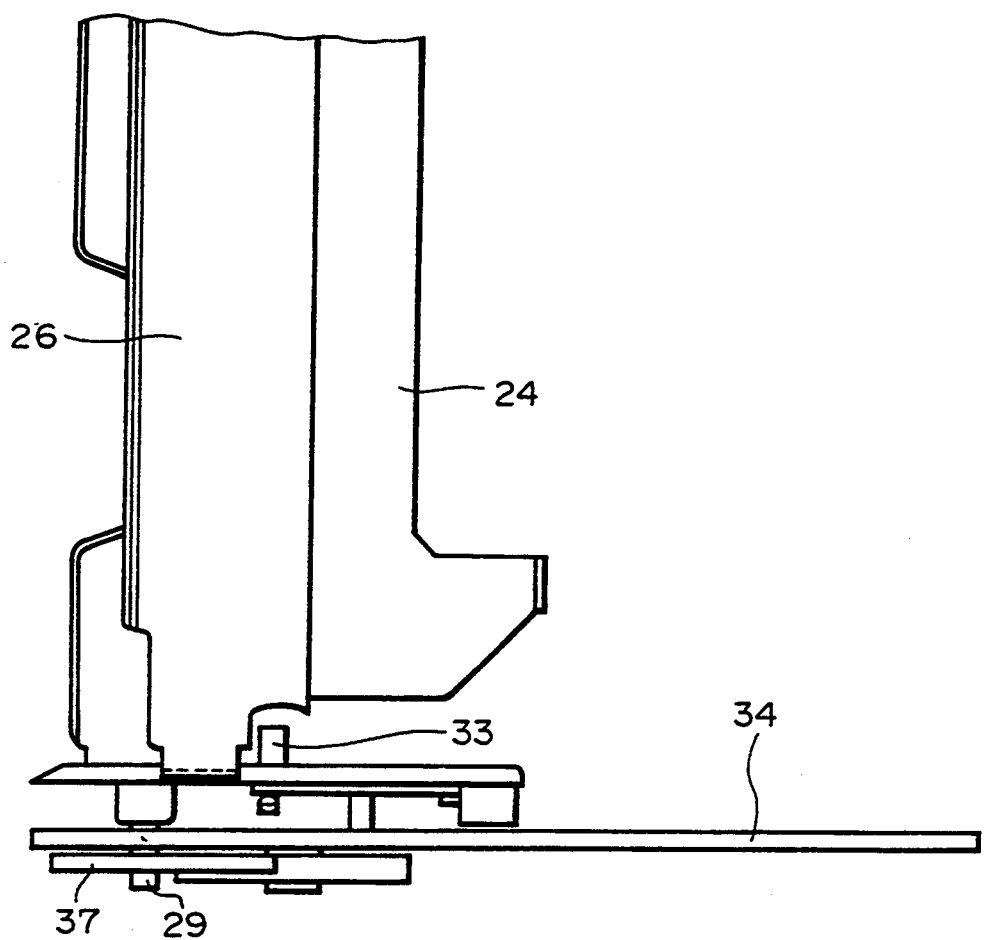
FIGS. 14A and 15A, and FIGS. 14B and 15B are plan views and side elevational views, respectively, showing the manner in which the loading mechanism operates.
Figure 14B:
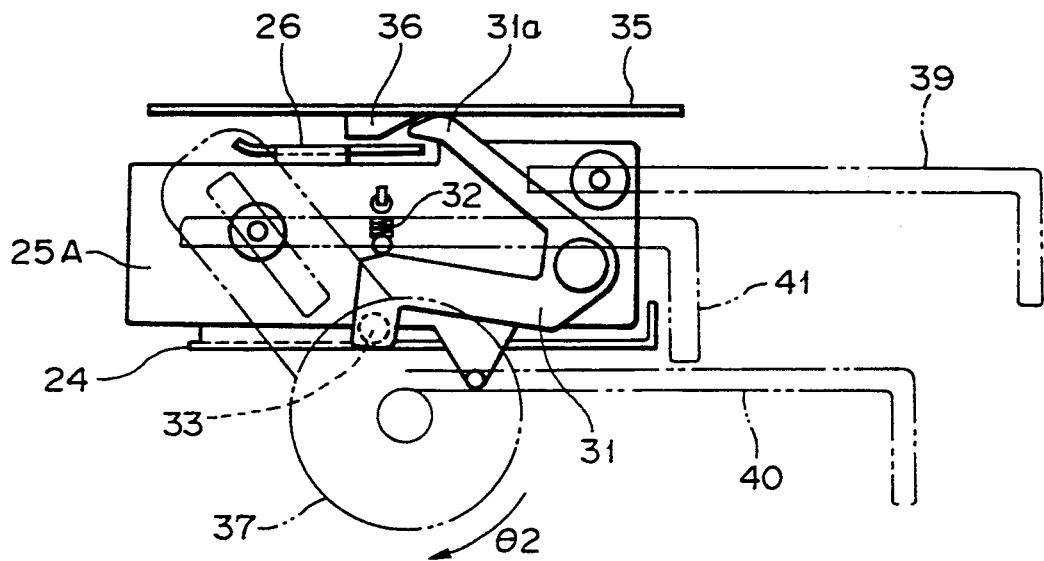

Operation of the loading mechanism will be described below with reference to FIGS. 14A, 14B and FIGS. 15A, 15B. FIGS. 14A and 14B are plan and side elevational views, respectively, showing the cassette holder pushed into the video tape recorder slightly beyond the position shown in FIG. 12. At this time, the end 31a of the lever 31 goes beyond the projection 36 of the fixed top plate 35 and the spring 32 urges the lever 31 to turn in the clockwise direction. Therefore, the locking pin 33 on the other end 31b of the lever 31 is positioned above the upper surface of the bottom plate 24 of the cassette holder, and fitted in the recess 13B of the tape cassette.

Figure 15A:
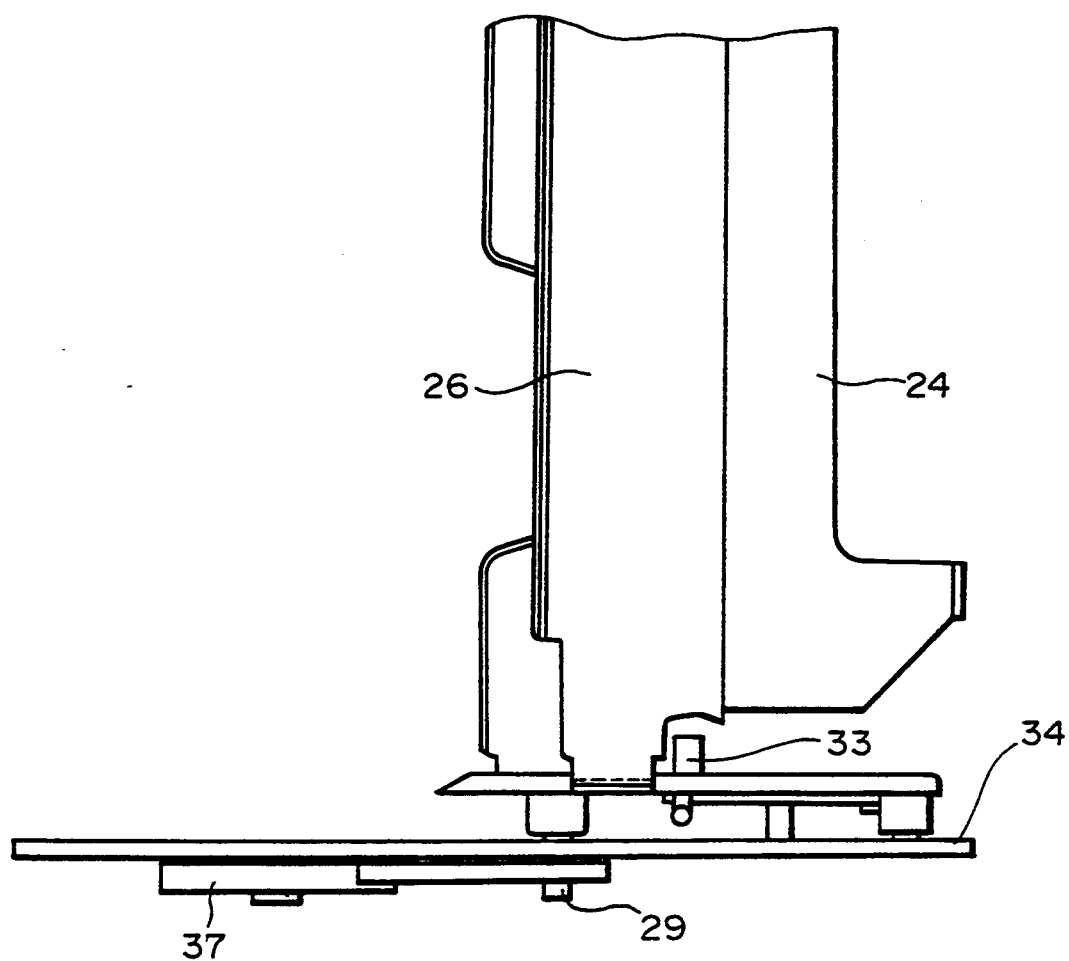
Figure 15B:
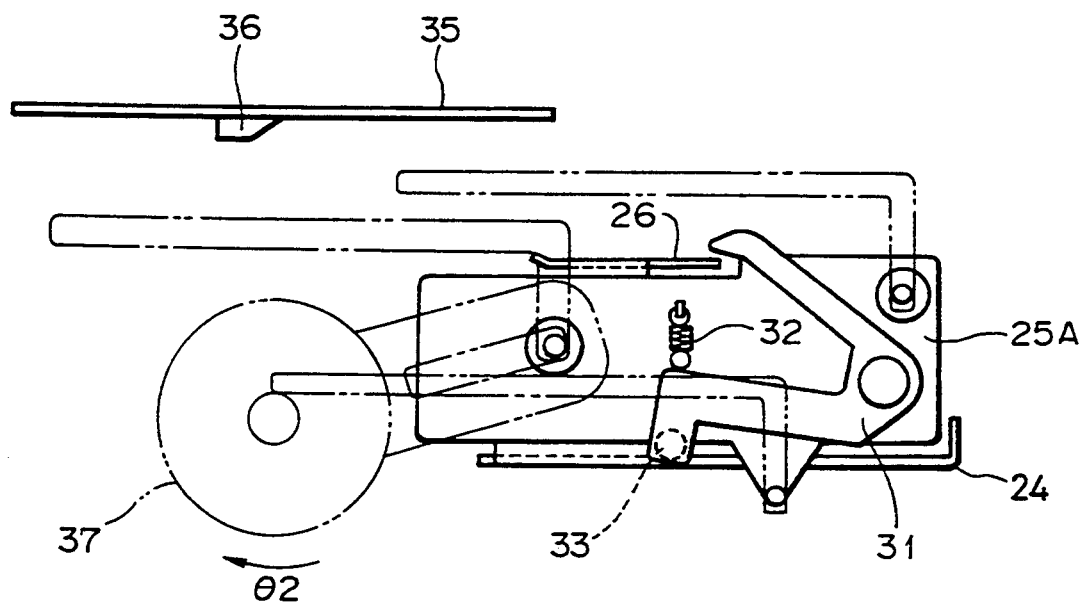

FIGS. 15A and 15B are plan and side elevational views, respectively, showing the cassette holder that is inserted further when the actuator arm 37 is rotated in the direction indicated by the arrow θ2 from the angular position shown in FIG. 14B. The cassette holder is moved to a position near the recording and reproducing heads with the locking pin 33 on the upper surface of the bottom plate 24.

Figure 16A:
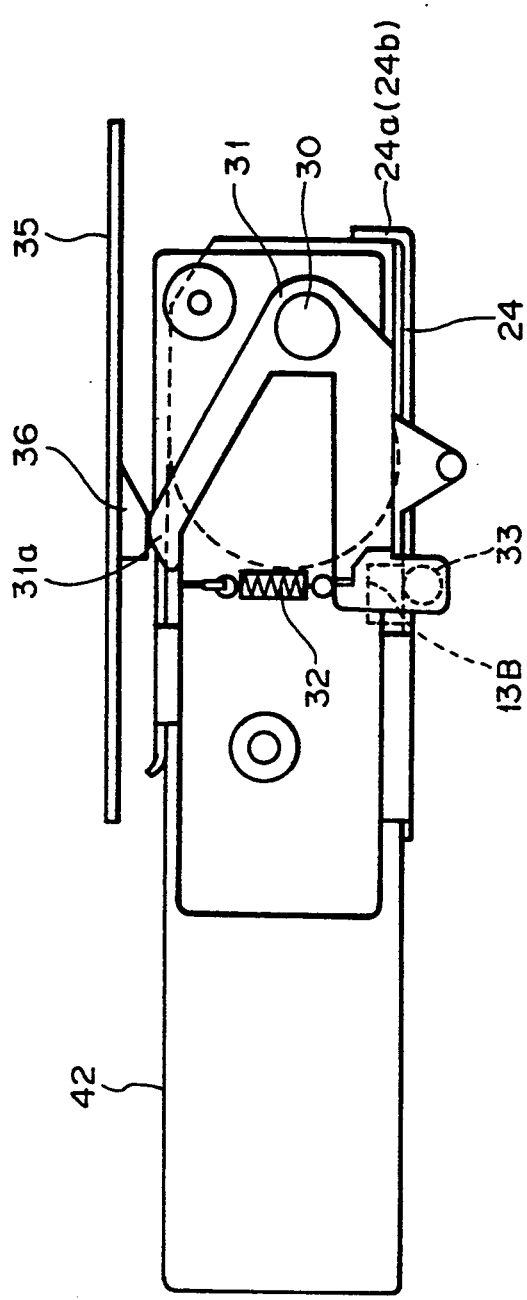
FIGS. 16A and 16B are side elevational views showing the manner in which the tape cassette is set into the cassette holder.
Figure 16B:
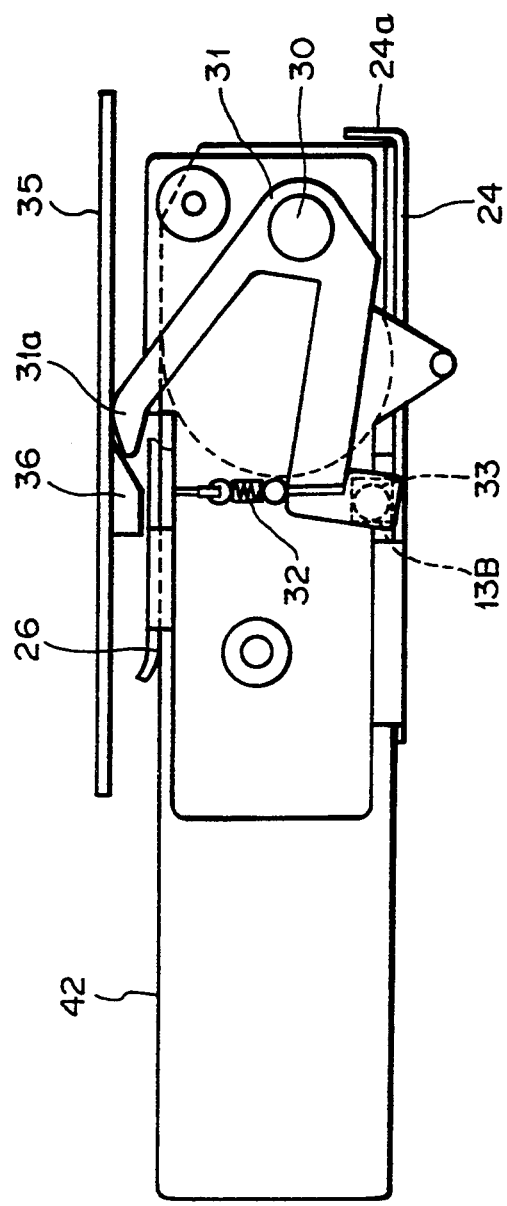

The tape cassette is denoted at 42 in FIGS. 16A and 16B. After the tape cassette 42 is inserted into the cassette insertion slot of the video tape recorder and until the tape cassette 42 is engaged by the stoppers 24a, 24b at the front of the bottom plate 24 of the cassette holder, as shown in FIG. 16A, the end 31a of the lever 31 remains in contact with the projection 36 of the fixed top plate 35. Therefore, the locking pin 33 on the end 31b of the lever 31 is positioned below the bottom plate 24, allowing the tape cassette 42 to be smoothly inserted.

Continued insertion of the tape cassette 42 displaces the cassette holder and thereby moves the end 31a of the lever 31 off the projection 36 of the fixed top plate 35, whereupon the locking pin 33 fits into the recess 13B of the tape cassette 42. At the same time, the locking pin on the other side fits into the recess 13A of the tape cassette 42. Therefore, the tape cassette 42 is pressed against the top plate 26 of the cassette holder, and is securely anchored in position within the cassette holder. When the cassette holder, with the tape cassette 42 locked therein, is moved at high speed to a position near the recording and reproducing heads by the actuator arm 37, the tape cassette 42 and the cassette holder are prevented from being positionally displaced with respect to each other. As a result, signals can stably be recorded on and reproduced from the magnetic tape 17 in the tape cassette 42 by the recording and reproducing heads.

To eject the tape cassette 42 after desired signals have been recorded or reproduced, the actuator arm 37 is rotated back by the actuator mechanism to return the cassette holder to the position shown in FIG. 16A, where both locking pins 33 are displaced out of the recesses 13A and 13B, so that the user can easily remove the tape cassette 42 smoothly from the video tape recorder.

As described above, inasmuch as the tape cassette has the recesses 13A, 13B for receiving the locking pins, the tape cassette can be locked in the cassette holder in the video tape recorder. Consequently, the tape cassette can be loaded at high speed. In addition, the loading mechanism for the tape cassette can be designed with an increased degree of freedom or flexibility.

When the tape cassette is inserted into the video tape recorder, no frictional forces are applied to the tape cassette by presser springs or the like until the tape cassette reaches the stoppers 24a, 24b of the bottom plate 24 of the cassette holder. Thus, the tape cassette can be inserted smoothly, and the retentive forces with which the tape cassette is retained in the cassette holder will not weaken with wear or time.

The recess 13A is defined in the boundary region between the bottom plate 15 and the side plate 22 of the lower casing half 9. However, as shown in FIG. 4, the recess 13A may be defined in one side plate of the upper casing half 10 at a position P2, and the recess 13B may also be defined in the other side plate of the upper casing half 10 at a symmetrical position. Alternatively, these recesses may be defined in the bottom plate 15 of the lower casing half 9 or the top plate of the upper casing half 10.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

I claim:

1. A tape cassette for use in a recording and reproducing apparatus, comprising:
    a casing having an opening, a top surface, a bottom surface, and a side surface;
    a pair of reels rotatably mounted in said casing with a tape wound around said reels and being withdrawable from said casing through said opening; and
    a lid pivotally mounted on said casing by a pair of pivot members each respectively located at an end of said lid for covering said opening with said lid when the cassette is not is use;
    said casing having at least two holes located in said side surface; each of said holes being located near said bottom surface of said casing at a predetermined distance from said top surface, said predetermined distance being the same for all of said holes; each of said holes being entirely located in close proximity to said pivot members of said lid and being positioned a first length from a respective pivot member and a second length from the center of a reel such that said first length is a minimum length and said second length is a maximum length to avoid contact between a reel and a holding member of the recording and reproducing apparatus when the holding member is inserted into said hole and to avoid contact between the holding member and the tape when the tape is withdrawn from said cassette; said holes providing the sole medium for secure engagement of said cassette by the holding members.

2. A tape cassette according to claim 1, wherein at least one pair of said holes are defined in respective opposite sides of said side surface.

3. A tape cassette for use in a recording and reproducing apparatus, comprising:
   a casing having an opening, a top surface, a bottom surface, and a side surface;
   a pair of reels rotatably mounted in said casing with a tape wound around said reels and being withdrawable from said casing through said opening; and
   a lid pivotally mounted on said casing by a pair of pivot members each respectively located at an end of said lid for covering said opening with said lid when the cassette is not is use;
   said casing having at least two recesses in said side surface, each of said recesses being located near said bottom surface and in close proximity to said pivot members of said lid and being positioned a first length from a respective pivot member and a second length from the center of a reel such that said first length is a minimum length and said second length is a maximum length to avoid contact between a reel and a holding member of the recording and reproducing apparatus when the holding member is inserted into said recess and to avoid contact between the holding member and the tape when the tape is withdrawn from said cassette, said recesses providing the sole medium for secure engagement of said cassette by the holding members of the recording and reproducing apparatus; and
   wherein said casing comprises upper and lower casing halves, said lower casing half having a bottom plate forming said bottom surface and a side plate joined thereto, forming at least part of said side surface, at least two of said recesses being defined in a boundary region between said bottom and side plates.

4. A tape cassette according to claim 1, wherein said casing comprises upper and lower casing halves, said lower casing half having a side plate forming at least part of said side surface, at least two of said holes being defined in said side plate near said bottom surface.

5. In a video tape recorder, a cassette holding mechanism including a cassette holder, means for mounting said cassette holder for movement between a cassette inserting and ejecting position and an operative position, cassette locking means mounted on said cassette holder and being movably between locking and releasing positions, means for urging said locking means to said locking position, and means for moving said locking means to said releasing position when said cassette holder is in proximity of said cassette inserting and ejecting position; and a tape cassette including a casing movably into and out of said cassette holder at said cassette inserting and ejecting position and having an opening, a top surface, a bottom surface, and a side surface, said tape cassette further having a pair of reels rotatable in said casing with a tape wound around said reels and being withdrawably from said casing through said opening, a lid pivotally mounted on said casing for covering said opening when the cassette is not in use, and said casing having at least two recesses located in said side surface near said bottom surface and near said lid which is clear of said locking means when the latter is in said releasing position so as to permit inserting and ejecting of said tape cassette in said holder, said recesses being engageably by said locking means for securely positioning said tape cassette in said cassette holder in response to deviation of said cassette holder from said cassette inserting and ejecting position with said tape cassette fully inserted in said cassette holder.

6. A tape cassette according to claim 1, wherein said holes are defined in a boundary region between said bottom surface and said side surface of said casing.

7. A tape cassette according to claim 1, wherein said holes provide the sole medium for secure engagement of said cassette when the holding members of the recording and reproducing apparatus are inserted into said holes, thereby securely positioning said top surface of said cassette against a surface of the recording and reproducing apparatus.

8. A tape cassette according to claim 2, wherein said holes are defined in a boundary region between said bottom surface and said side surface of said casing.

* * * * *